United States Patent [19]
Apelian et al.

[11] Patent Number: 5,200,168
[45] Date of Patent: Apr. 6, 1993

[54] PROCESS FOR THE DEALUMINATION OF ZEOLITE BETA

[75] Inventors: Minas R. Apelian, Vincetown; Thomas F. Degnan, Moorestown, both of N.J.; Anthony S. Fung, Chadds Ford, Pa.; Gordon J. Kennedy, Turnersville, N.J.

[73] Assignee: Mobil Oil Corp., Fairfax, Va.

[21] Appl. No.: 828,624

[22] Filed: Jan. 31, 1992

[51] Int. Cl.$^5$ .............................................. C01B 33/34
[52] U.S. Cl. ...................................... 423/714; 502/77; 502/85; 423/DIG. 27
[58] Field of Search ............... 423/326, 328, 329, 330, 423/714, DIG. 27; 502/60, 64, 77, 85, 86

[56] References Cited

U.S. PATENT DOCUMENTS

| Re. 28,341 | 2/1975 | Wadlinger et al. | 208/120 |
| 3,308,069 | 3/1967 | Wadlinger et al. | 252/455 |
| 3,442,795 | 5/1969 | Kerr et al. | 208/120 |
| 4,388,177 | 6/1983 | Bowes et al. | 208/111 |
| 4,419,220 | 12/1983 | LaPierre et al. | 208/111 |
| 4,701,313 | 10/1987 | Chang et al. | 423/328 |

FOREIGN PATENT DOCUMENTS 0259526  9/1991  European Pat. Off. .

Primary Examiner—R. Bruce Breneman
Attorney, Agent, or Firm—Alexander J. McKillop; Dennis P. Santini; Lori F. Cuomo

[57] ABSTRACT

A process for the dealumination of a zeolite having the structure of zeolite Beta by contacting the zeolite with dicarboxylic acid, such as oxalic acid.

18 Claims, No Drawings

PROCESS FOR THE DEALUMINATION OF ZEOLITE BETA

FIELD OF THE INVENTION

This application is directed to a process for the dealumination of zeolite Beta by contacting with dicarboxylic acid.

BACKGROUND OF THE INVENTION

Zeolitic materials, both natural and synthetic, have been demonstrated to have catalytic properties for various types of hydrocarbon conversion. It is often advantageous to dealuminate these materials in order to improve their process performance. Performance measures typically improved include product selectivity, product quality and catalyst stability.

Conventional techniques for zeolite dealumination include hydrothermal treatment, mineral acid treatment with HCl, HNO$_3$, and H$_2$SO$_4$, and chemical treatment with SiCl$_4$ or EDTA. The treatments are limited, in many cases, in the extent of dealumination by the onset of crystal degradation and loss of sorption capacity. U.S. Pat. No. 4,419,220 to LaPierre et al discloses that dealumination of zeolite Beta via treatment with HCl solutions is limited to SiO$_2$/Al$_2$O$_3$ ratios of about 200 to 300 beyond which significant losses to zeolite crystallinity are observed.

U.S. Pat. No. 3,442,795 to Kerr et al. describes a process for preparing highly siliceous zeolite-type materials from crystalline aluminosilicates by means of a solvolysis, e.g. hydrolysis, followed by a chelation. In this process, the acid form of a zeolite is subjected to hydrolysis, to remove aluminum from the aluminosilicate. The aluminum can then be physically separated from the aluminosilicate by the use of complexing or chelating agents such as ethylenediaminetetraacetic acid or carboxylic acid, to form aluminum complexes that are readily removable from the aluminosilicate. The examples are directed to the use of EDTA to remove alumina.

EP 0 259 526 B1 discloses the use of dealumination in producing ECR-17. The preferred dealumination method involves a combination of steam treatment and acid leaching, or chemical treatments with silicon halides. The acid used is preferably a mineral acid, such as HCl, HNO$_3$ or H$_2$SO$_4$, but may also be weaker acids such as formic, acetic, citric, oxalic, tartaric acids and the like. Dealumination of zeolite Beta is not disclosed.

Therefore, it is an object of the present invention to provide a process for dealumination of a zeolite having the structure of zeolite Beta without significant loss of crystallinity. It is a further object of the present invention to increase the silica to alumina ratio in a zeolite having the structure of zeolite Beta. It is a further object of the present invention to improve process performance of a zeolite having the structure of zeolite Beta.

SUMMARY OF THE INVENTION

The present invention provides a process for the dealumination of a zeolite having the structure of zeolite Beta by contacting the zeolite with dicarboxylic acid. The treatment with dicarboxylic acid is believed to remove aluminum from the crystalline framework of the zeolite via a chelating mechanism.

The invention therefore includes a process for the dealumination of a zeolite having the structure of zeolite Beta, which comprises contacting said zeolite having the structure of zeolite Beta with dicarboxylic acid for a sufficient time to effect greater than about 50% dealumination.

DETAILED DESCRIPTION OF THE INVENTION

The process of this invention is useful for the dealumination of a zeolite having the structure of zeolite Beta. Zeolite Beta is described in U.S. Pat. Nos. 3,308,069 and Re 28,341, incorporated herein by reference.

It is well known that the crystalline zeolites, including zeolite Beta, have a structure consisting of a porous, robust framework. The framework consists principally of silicon tetrahedrally coordinated and interconnected with oxygen bridges. Other framework components may include Group IIIB elements of the Periodic Table, e.g. aluminum, boron and gallium, and iron.

It may be desirable to incorporate the zeolite with another material resistant to the temperature and other conditions employed in the process, prior to dealumination. Such matrix materials include synthetic or natural substances as well as inorganic materials such as clay, silica and/or metal oxides, such as titania or zirconia. The latter may be either naturally occurring or in the form of gelatinous precipitates or gels including mixtures of silica and metal oxides. Naturally occurring clays which can be composited with the zeolite include those of the montmorillonite and kaolin families. These clays can be used in the raw state as originally mined or initially subjected to calcination, acid treatment or chemical modification. These materials, i.e. clays, oxides, etc., function, in part, as binders for the catalyst.

Prior to or following dealumination the zeolite ma be composited with a porous matrix material, such as alumina, silica-alumina, silica-magnesia, silica-zirconia, silica-thoria, silica-beryllia, silica-titania as well as ternary compositions, such as silica-alumina-thoria, silica-alumina-zirconia, silica-alumina-magnesia, and silica-magnesia-zirconia. The matrix may be in the form of a cogel. The relative proportions of zeolite component and inorganic oxide gel matrix may vary widely with the zeolite content ranging from between 1 to 99, more usually 5 to 80, percent by weight of the composite.

Suitable dicarboxylic acids for use in the process of this invention include oxalic, malonic, succinic, glutaric, adipic, maleic, phthalic, isophthalic, terephthalic, fumaric or mixtures thereof. Oxalic acid is preferred. The dicarboxylic acid may be used in solution, such as an aqueous dicarboxylic acid solution.

Generally, the acid solution has a concentration in the range from about 0.01 to about 4M. Preferably, the acid solution concentration is in the range from about 1 to about 3M.

The dicarboxylic acid is generally in a volume solution to volume catalyst ratio of at least about 1:1, preferably at least about 4:1.

Treatment time with the dicarboxylic acid solution is as long as required to provide the desired dealumination. Generally the treatment time is at least about 10 minutes. Preferably, the treatment time is at least about 1 hour.

More than one dicarboxylic acid treatment step may be employed in the process of the present invention for enhanced dealumination.

The treatment temperature is generally in the range from about 32° F. to about reflux. Preferably, the treatment temperature is from about 60° F. to about 200° F., and more preferably from about 120° F. to about 180° F.

The dicarboxylic acid treatment of this invention results in greater than about 50% dealumination, preferably greater than about 75% dealumination and more preferably greater than about 85% dealumination, with essentially no loss in crystallinity. Crystallinity, as described herein, is a measure of the difference in cyclohexane sorption between the untreated material and the material treated with dicarboxylic acid. The dealuminated products obtained have a broad silica to alumina ratio. Generally, the silica to alumina ratio is in the range of from about 100:1 to about 800:1, preferably from about 400:1 to about 800:1, and more preferably from about 600:1 to about 800:1.

Ammonium exchange, a conventional sodium removal method, is not required in the process of this invention. The dicarboxylic acid treatment removes sodium along with the aluminum.

The dicarboxylic acid treatment of this invention may also be combined with other conventional dealumination techniques, such as steaming and chemical treatment.

The following examples illustrate the process of the present invention.

EXAMPLE 1

Zeolite Beta, prepared in accordance with U.S. Pat. Nos. 3,308,069 and Re 28,341, incorporated herein by reference, is exchanged with a solution of $NH_4NO_3$ to remove sodium and dried at 250° F. for 8 hours. Organics are removed by first treating in $N_2$ at 950° F. for 3 hours followed by air calcination at 1000° F. for 6 hours. The calcined zeolite referred to henceforth as material A has the following properties:

| | |
|---|---|
| Sodium, ppmw | 510 |
| Cyclohexane Sorption, wt % | 21 |
| $Al_2O_3$, wt % | 4.6 |

EXAMPLE 2

A sample of material A as set forth in Example 1 is treated with a 2M solution of oxalic acid at a volume ratio of solution to catalyst of 8 to 1. Treatment is conducted at 150° F. for 1 hour. The treated catalyst is dried at 250° F. overnight. The dried material is air calcined at 1000° F. for 3 hours. The treatment results in 91% dealumination with essentially no loss in cyclohexane sorption capacity. The treated material has the following properties:

| | |
|---|---|
| Sodium, ppmw | 41 |
| Cyclohexane Sorption, wt % | 20 |
| $Al_2O_3$, wt % | 0.40 |

EXAMPLE 3

A sample of material A as set forth in Example 1 is treated with a 2M solution of oxalic acid at a volume ratio of solution to catalyst of 8 to 1. Treatment is conducted at 160° F. for 3 hours. The treated catalyst is dried at 250° F. overnight. The dried material is air calcined at 1000° F. for 3 hours. The treatment results in 94% dealumination with essentially no loss in cyclohexane sorption capacity. The treated material has the following properties:

| | |
|---|---|
| Sodium, ppmw | 21 |
| Cyclohexane Sorption, wt % | 21 |
| $Al_2O_3$, wt % | 0.26 |

EXAMPLE 4

Zeolite Beta, prepared in accordance with U.S. Pat. Nos. 3,308,069 and Re 28,341, incorporated herein by reference, is mull/mixed with $SiO_2$ at a composition of 65 wt% zeolite and 35 wt% $SiO_2$ on an ash basis. The material is extruded into pellets. Organics are removed by first treating in $N_2$ at 950° F. for 3 hours followed by air calcination at 1000° F. for 8 hours. The calcined extrudate referred to henceforth as material B has the following properties:

| | |
|---|---|
| Sodium, ppmw | 15000 |
| Cyclohexane Sorption, wt % | 12 |
| $Al_2O_3$, wt % | 3.0 |

EXAMPLE 5

A sample of material B as set forth in Example 4 is treated with a 2M solution of oxalic acid at a volume ratio of solution to catalyst of 8 to 1. Treatment is conducted at 160° F. for 2 hours. The treated catalyst is dried at 250° F. overnight. The dried material is air calcined at 1000° F. for 3 hours. The treatment results in 87% dealumination with essentially no loss in cyclohexane sorption capacity. The treated material has the following properties:

| | |
|---|---|
| Sodium, ppmw | 795 |
| Cyclohexane Sorption, wt % | 11 |
| $Al_2O_3$, wt % | 0.40 |

EXAMPLE 6

A sample of material B as set forth in Example 4 is treated with a 2M solution of oxalic acid at a solution to catalyst ratio of 16 to 1. Treatment is conducted at 160° F. for 3 hours. The treated catalyst is dried at 250° F. overnight. The dried material is air calcined at 1000° F. for 3 hours. The treatment results in 88% dealumination with essentially no loss in cyclohexane sorption capacity. The treated material has the following properties:

| | |
|---|---|
| Sodium, ppmw | 525 |
| Cyclohexane Sorption, wt % | 11 |
| $Al_2O_3$, wt % | 0.37 |

EXAMPLE 7

A sample of material B as set forth in Example 4 is treated with a 3M solution of oxalic acid at a volume ratio of solution to acid of 8 to 1. Treatment is conducted at 160° F. for 3 hours. The material is washed with water and exposed to a second treatment with a fresh 3M oxalic acid solution at the sam conditions. The treated catalyst is dried at 250° F. overnight. The dried material is air calcined at 1000° F. for 3 hours. The treatment results in 93% dealumination with essentially no loss in cyclohexane sorption capacity. The treated material has the following properties:

| Sodium, ppmw | 93 |
| --- | --- |
| Cyclohexane Sorption, wt % | 12 |
| $Al_2O_3$, wt % | 0.22 |

EXAMPLE 8

Zeolite Beta, prepared in accordance with U.S. Pat. Nos. 3,308,069 and Re 28,341, incorporated herein by reference, is treated by contacting 126 parts by weight oxalic acid and 63 parts by weight zeolite in 1000 parts by weight water at 160° F. for 1 hour. The treated zeolite is dried at 250° F. and then is air calcined at 1000° F. for 3 hours. The treatment results in 88% dealumination. There is no significant loss in cyclohexane sorption capacity.

EXAMPLE 9

This is a comparative example which demonstrates increased % dealumination with oxalic acid over EDTA. Zeolite Beta, prepared in accordance with U.S. Pat. Nos. 3,308,069 and Re 28,341, incorporated herein by reference, is treated by contacting 10 parts by weight of EDTA and 10 parts by weight zeolite in 30 parts by weight water at 160° F. for 1 hour. The treated zeolite is washed twice with 10 cc water/cc zeolite, dried at 250° F. and then is air calcined at 1000° F. for 3 hours. The treatment results in only 15% dealumination. There is no significant loss in cyclohexane sorption capacity. Treatment with oxalic acid as shown in Example 8 produces a much higher % dealumination.

EXAMPLE 10

Zeolite Beta, prepared in accordance with U.S. Pat. Nos. 3,308,069 and Re 28,341, incorporated herein by reference, having an $SiO_2/Al_2O_3$ ratio of 36:1, is ammonium exchanged twice at room temperature, with 1M $NH_4NO_3$, dried at 250° F. overnight, mixed with $SiO_2$ at a composition of 65 wt.% zeolite and 35 wt.% $SiO_2$ and extruded. The extrudate catalyst is calcined by heating in $N_2$ at 900° F. for 3 hours, then in air at 1000° F. for 3 hours. The $Al_2O_3$ content of the bound catalyst is 3.0 wt.%. The catalyst is treated with 8 cc oxalic acid/cc catalyst of 2.0M oxalic acid at 160° F. for 1 hour. The catalyst is water washed, dried at 250° F. overnight and calcined by heating in air at 1000° F. for 3 hours. The resultant catalyst has an $Al_2O_3$ content of 0.28 wt.%. The treatment results in 91% dealumination.

EXAMPLE 11

This is a comparative example which demonstrates increased % dealumination with oxalic acid over HCl. The same zeolite Beta used in Example 10 ($SiO_2/Al_2O_3=36:1$) is ammonium exchanged twice at room temperature with 1M $NH_4NO_3$, washed, dried at 250° F. overnight, mixed with $SiO_2$ and extruded to provide an analogous catalyst to Example 10 having a zeolite:$SiO_2$ weight ratio of 65:35. The extrudate catalyst is calcined by heating in $N_2$ at 900° F. for 3 hours, then in air for 3 hours. The $Al_2O_3$ content of the bound catalyst is 3.0 wt.%. The catalyst is treated with 8 cc hydrochloric acid/cc catalyst of 2.0M hydrochloric acid at 160° F. The catalyst is water washed, dried at 250° F. overnight and calcined by heating in air at 1000° F. for 3 hours. The resultant catalyst has an $Al_2O_3$ content of 2.35 wt.%. The treatment results in only 22% dealumination. Treatment with oxalic acid as shown in Example 10 produces a much higher % dealumination.

Changes and modifications in the specifically described embodiments can be carried out without departing from the scope of the invention which is intended to be limited only by the scope of the appended claims.

We claim:

1. A process for the dealumination of a zeolite having the structure of zeolite Beta, which comprises contacting said zeolite having the structure of zeolite Beta with dicarboxylic acid for a sufficient time to effect greater than about 50% dealumination.

2. The process of claim 1 wherein greater than about 85% dealumination is effected.

3. The process of claim 1 wherein the dealuminated zeolite having the structure of zeolite Beta has a silica to alumina ratio of greater than about 400 to 1.

4. The process of claim 1 wherein the dealuminated zeolite having the structure of zeolite Beta has a silica to alumina ratio of greater than about 600 to 1.

5. The process of claim 1 wherein said contacting results in less than about 10% loss of crystallinity.

6. The process of claim 1 wherein said dicarboxylic acid is in solution.

7. The process of claim 6 wherein said solution of dicarboxylic acid is at a volume ratio of solution to catalyst of at least about 1:1.

8. The process of claim 1 wherein said dicarboxylic acid is an aqueous dicarboxylic acid solution.

9. The process of claim 1 wherein said dicarboxylic acid is in a concentration in the range of from about 0.01 to about 4M.

10. The process of claim 1 wherein said dicarboxylic acid is selected from the group consisting of oxalic, malonic, succinic, glutaric, adipic, maleic, phthalic, isophthalic, terephthalic, fumaric and mixtures thereof.

11. The process of claim 1 wherein said dicarboxylic acid is oxalic acid.

12. The process of claim 1 wherein said contacting is for a time of at least about 10 minutes.

13. The process of claim 1 wherein said contacting is at a temperature in the range of from about 60° F. to about 200° F.

14. The process of claim 1 wherein said zeolite having the structure of zeolite Beta is incorporated with a binder prior to said dealumination.

15. The process of claim 14 wherein said binder is silica.

16. A process for the dealumination of a zeolite having the structure of zeolite Beta, which comprises contacting said zeolite having the structure of zeolite Beta with oxalic acid for a sufficient time to effect greater than about 50% dealumination.

17. The zeolite having the structure of zeolite Beta produced by the process of claim 1, wherein said zeolite has a slicia to alumina ratio greater than about 600 to 1.

18. The zeolite having the structure of zeolite Beta produced by the process of claim 16, wherein said zeolite has a silica to alumina ratio greater than about 600 to 1.

* * * * *

UNITED STATES PATENT AND TRADEMARK OFFICE
CERTIFICATE OF CORRECTION

PATENT NO. : 5,200,168
DATED : April 6, 1993
INVENTOR(S) : M.R. Apelian et al.

It is certified that error appears in the above-identified patent and that said Letters Patent is hereby corrected as shown below:

Col. 6, claim 17, line 60     "slicia" should be --silica--

Signed and Sealed this

Eleventh Day of January, 1994

Attest:

BRUCE LEHMAN

*Attesting Officer*     *Commissioner of Patents and Trademarks*